United States Patent
Winney et al.

(10) Patent No.: US 10,272,532 B2
(45) Date of Patent: Apr. 30, 2019

(54) APPARATUS FOR SEPARATING WORKPIECES

(71) Applicant: HOMAG GmbH, Schopfloch (DE)

(72) Inventors: Stephen Winney, Freudenstadt (DE); Michael Mueller, Waldachtal (DE); Marcel Steeb, Baiersbronn-Mitteltal (DE); Michael Thumm, Neustetten (DE)

(73) Assignee: HOMAG GMBH, Schopfloch (DE)

( * ) Notice: Subject to any disclaimer, the term of this patent is extended or adjusted under 35 U.S.C. 154(b) by 0 days.

(21) Appl. No.: 15/961,708

(22) Filed: Apr. 24, 2018

(65) Prior Publication Data

US 2018/0311776 A1   Nov. 1, 2018

(30) Foreign Application Priority Data

Apr. 26, 2017   (DE) .................. 10 2017 207 004

(51) Int. Cl.
| | |
|---|---|
| B65G 59/06 | (2006.01) |
| B65H 3/34 | (2006.01) |
| B65H 3/04 | (2006.01) |
| B23Q 7/14 | (2006.01) |
| B27M 1/08 | (2006.01) |
| B23Q 7/00 | (2006.01) |
| B65H 3/54 | (2006.01) |
| B23P 19/00 | (2006.01) |

(52) U.S. Cl.
CPC .......... *B23Q 7/1447* (2013.01); *B23Q 7/005* (2013.01); *B27M 1/08* (2013.01); *B65G 59/06* (2013.01); *B65H 3/042* (2013.01); *B65H 3/34* (2013.01); *B65H 3/54* (2013.01); *B23P 19/004* (2013.01); *B65H 2701/1938* (2013.01)

(58) Field of Classification Search
CPC .............................. B65G 59/06; B65G 59/067
USPC ...................... 414/797.4, 797.5, 797.6, 797.7
See application file for complete search history.

(56) References Cited

U.S. PATENT DOCUMENTS

| | | | |
|---|---|---|---|
| 4,981,223 A * | 1/1991 | Gabbatiss | B65H 3/126 414/797.7 |
| 5,326,219 A * | 7/1994 | Pippin | B65G 1/1376 414/797.6 |
| 6,626,633 B2 * | 9/2003 | Jendzurski | B65G 59/068 414/797.5 |
| 8,267,637 B2 * | 9/2012 | Ouellette | B65G 47/22 198/836.3 |

(Continued)

FOREIGN PATENT DOCUMENTS

| | | |
|---|---|---|
| DE | 1925179 | 11/1970 |
| DE | 10219982 | 7/2003 |

(Continued)

*Primary Examiner* — James R Bidwell
(74) *Attorney, Agent, or Firm* — Morgan, Lewis & Bockius LLP

(57) ABSTRACT

Apparatus for separating workpieces which preferably consist at least in sections of wood, wood-based materials, plastic or the like, having a workpiece magazine with a magazine area for holding a plurality of workpieces, in particular a stack of workpieces, a discharge device for discharging a workpiece out of the workpiece magazine, characterized in that the apparatus has a feed device which is set up to feed at least one workpiece held in the workpiece magazine to the discharge device.

14 Claims, 3 Drawing Sheets

(56) References Cited

U.S. PATENT DOCUMENTS

| | | | | |
|---|---|---|---|---|
| 8,480,346 B2 * | 7/2013 | Godol | ............... | H01L 21/67778 414/217 |
| 2005/0189697 A1 * | 9/2005 | Sting | ................... | B65G 59/067 271/20 |
| 2017/0297840 A1 * | 10/2017 | Capriotti | ................. | B65B 43/44 |

FOREIGN PATENT DOCUMENTS

| | | | | |
|---|---|---|---|---|
| EP | 0267665 | | 5/1988 | |
| GB | 2079260 | * | 1/1982 | ............... B65H 3/12 |

* cited by examiner

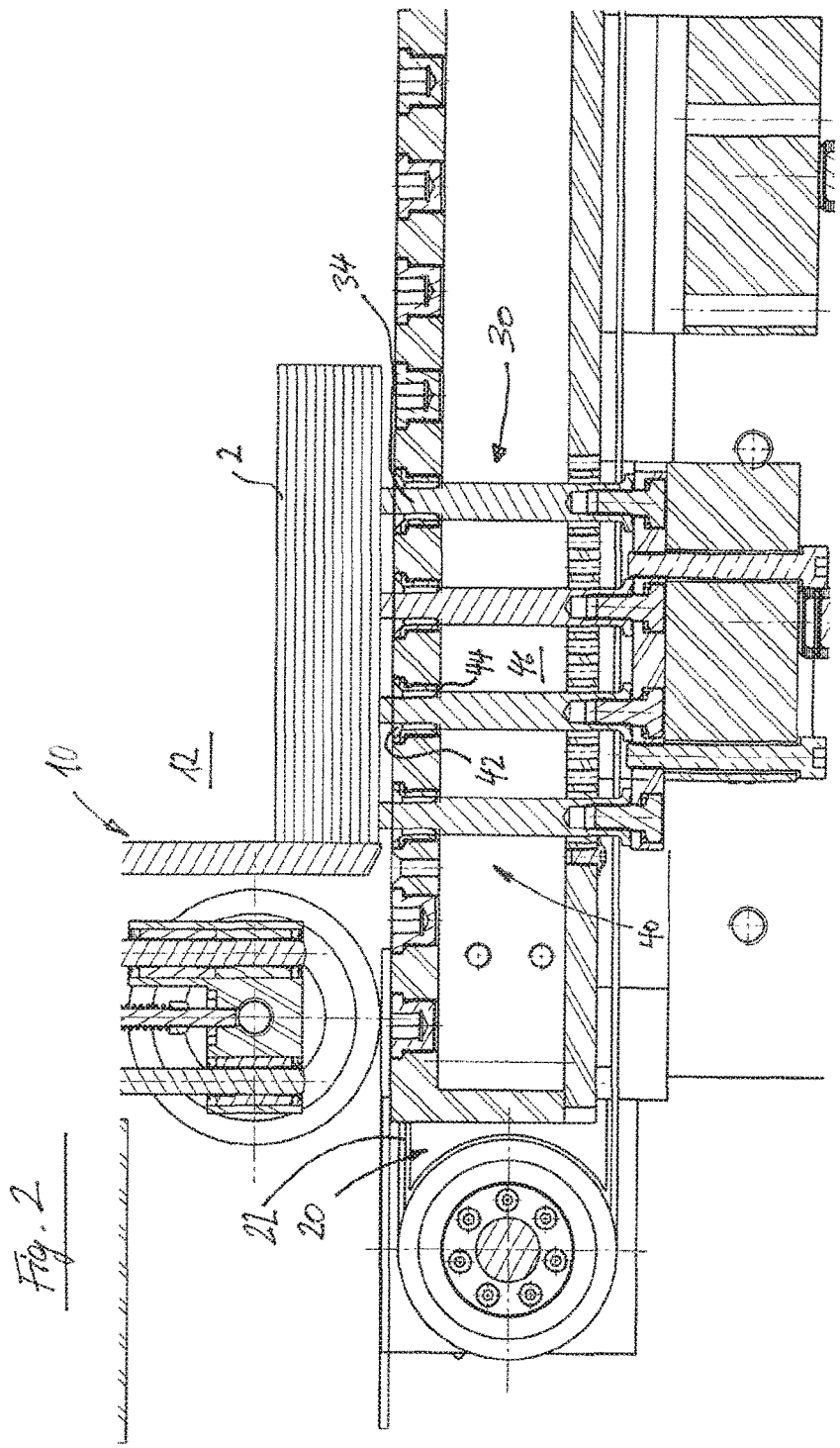

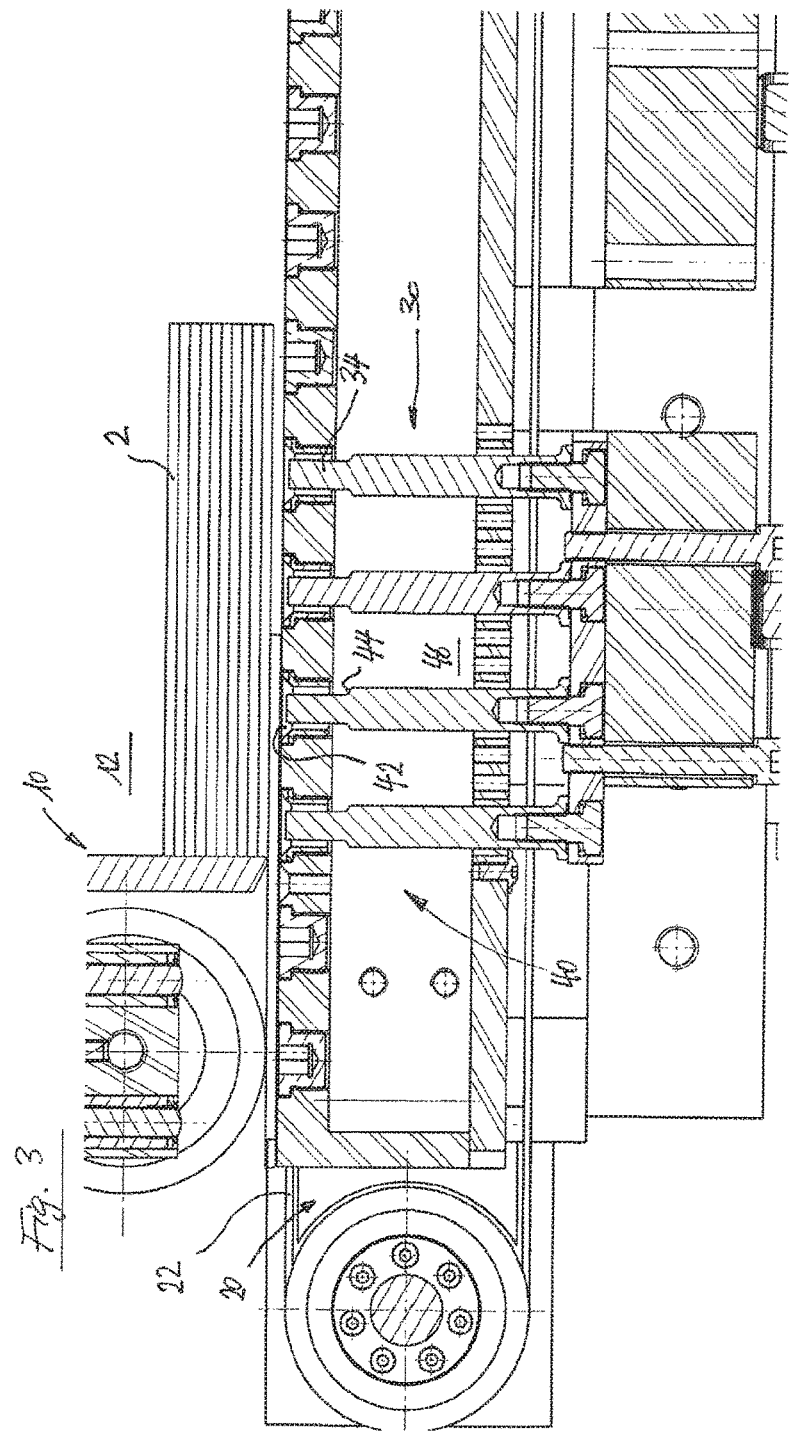

APPARATUS FOR SEPARATING WORKPIECES

CROSS-REFERENCE TO RELATED APPLICATIONS

This application claims priority under 35 U.S.C. § 119 to German Patent Application DE102017207004.8, filed on Apr. 26, 2017, the disclosure of which is incorporated herein by reference in its entirety.

TECHNICAL FIELD

Prior Art

In the area of the wood processing industry, workpieces are often provided in stacks in order to be fed subsequently to a machining apparatus and machined therein. Panels, such as are used for example as wall or floor covering, can be mentioned as examples.

The workpiece stacks are usually kept in a workpiece magazine and pushed individually out of the workpiece magazine by means of a discharge device. Cams or sliders, for example, can be used for this purpose.

However, with relatively thin workpieces that are unstable under bending, like panels, such systems have proven to be of only limited efficiency. The achievable cycle output is not generally adequate for modern machining devices in which panels are conveyed at very high machining speeds.

Against this background, systems were developed in which the respective lowest workpiece of a workpiece stack is discharged out of the magazine by means of a belt. However, the difficulty which arises with this system is that, in addition to the lowest workpiece, the adjacent workpiece is also discharged so that the desired separation cannot be achieved. This circumstance leads to an uncertain sequence.

PRESENTATION OF THE INVENTION

Against this background, the object of the invention is to provide an apparatus for separating workpieces of the type referred to at the outset which enables reliable separation of the workpieces with a high cycle output.

This object is achieved according to the invention by an apparatus according to claim 1. Especially preferred embodiments of the invention are disclosed in the dependent claims.

The invention is based on the idea of isolating holding of the workpieces in a workpiece magazine from discharging the workpieces by means of a discharge device. For this purpose, the apparatus according to the invention has a feed device which is set up to feed at least one workpiece held in the workpiece magazine to the discharge device. This makes it possible to achieve reliable separation even at high discharge speeds of the discharge device. In particular, the conveying operation of the conveying device can be isolated from the operating conditions of the workpiece magazine (such as the current stack height for example). As a result, this leads both to a higher separation speed and also to increased separation reliability.

The feed device can be designed in a variety of ways within the context of the invention. According to a development of the invention, however, it is provided that the feed device has first feed elements which are arranged at least in sections in the region of edges of the magazine area. As a result, a simple design enables stable feeding and, if necessary, also support of the workpieces provided in the magazine area.

In addition, according to a development of the invention, it is provided that the feed device has at least one second feed element which is arranged at least in sections at a distance from edges of the magazine area. As a result, particularly in the case of workpieces that are unstable under bending (such as panels for example), this prevents undesirable deflection of the workpieces which could lead to a premature or unwanted discharge of workpieces. This effect is particularly pronounced if the at least one second feed element is arranged between first feed elements.

It is preferable that the first feed elements and the at least one second feed element are mechanically connected to each other or are formed integrally. In this way, it is possible to carry out a common discharge movement. In particular, the feed elements can be connected by means of a common base.

Alternatively, according to a further variant, it is provided that the first feed elements and the at least one second feed element are electronically connected to each other (via a common control device for example), and in particular are movable separately from each other. It is preferable, however, that the movements of the feed elements are synchronised with each other.

It is preferable that the first feed elements and the second feed element are moved simultaneously. Alternatively, it is conceivable, for example, to initially move the first feed elements, and in this way to raise the workpiece or workpieces slightly. Following this, a path-controlled or force-controlled movement of the at least one second feed element is performed.

The second feed element can be bolt-shaped (see FIG. 2 for example), for example as a lifting bolt, extending in particular vertically, or strip-shaped. In the strip-shaped embodiment, the second feed element extends (preferably horizontally) along a workpiece surface to be picked up.

According to a preferred embodiment of the invention, the discharge device has at least one discharge element for discharging a workpiece out of the workpiece magazine, said discharge element preferably having a circulating endless conveyor. As a result, a high separation speed can be achieved with a simple design and low wear. Alternatively or in addition, the discharge device can also have a discharge element operating cyclically, such as a slider for example.

It is further preferable if the discharge device has two discharge elements (preferably circulating endless conveyors), it being particularly preferable that the second feed element (viewed from above) is arranged between the discharge elements. Thus, a compact apparatus can be provided in which a lifting point or lifting region is provided additionally between the discharge elements.

It is preferable that the two discharge elements can be driven by means of a common drive. In this way, a synchronous discharge movement is provided.

According to a development of the invention, the apparatus according to the invention further has a suction device for drawing a workpiece to be discharged to the discharge device. Due to this measure, even higher discharge and separation speeds can be achieved since it facilitates much better power transmission between discharge device and workpiece.

A particularly advantageous combination of the invention exists if a second feed element is also provided when using a suction device. This is because, particularly in the case of workpieces that are unstable under bending, the use of a suction device may possibly result in increased deflection of the workpieces which could cause premature or undesirable contact between discharge device and workpiece. Among other measures, it is particularly effective in this case to provide at least one second feed element as described above. This combination results in an exceptionally high separation speed with nevertheless very high separation reliability.

According to a development of the invention, the suction device has at least one suction opening which ends in the region of the discharge device. This results in the workpieces being drawn particularly efficiently to the discharge device. In this case, a wide variety of configurations are possible. Thus, at least one suction opening can be provided in such a manner that it acts, for example, on the workpiece through a discharge element of the discharge device, the discharge element being correspondingly designed for this purpose (for example provided with through-openings).

According to a development of the invention, it is further provided that the suction device has a negative pressure line with a closing device by means of which the negative pressure supply in the negative pressure line can be at least partially interrupted. This makes it possible to control the negative pressure operation of the suction device particularly precisely and at the same time save considerable amounts of energy. For example, the negative pressure supply can be interrupted by the closing device if no specific workpiece is to be discharged or separated by means of said discharge device.

In this case, it is particularly preferable that the closing device is synchronised with the feed device. As a result, the energy input required can be minimised with a reliable mode of operation. In this case, it is particularly preferable that the closing device is actuated by the feed device. As a result, both design and also control of the apparatus according to the invention can be simplified considerably.

The separating apparatus according to the invention is particularly suitable for use in a machining device for machining workpieces which preferably consist at least in sections of wood, wood-based materials, plastic or the like, as defined in claim 12.

The invention further relates to a method for separating workpieces, in particular using the apparatus previously referred to or the machining device previously referred to. The workpieces preferably consist at least in sections of wood, wood-based materials, plastic or the like. In particular, the workpieces are panels which are used, for example, for covering floors or walls.

The method comprises the following steps: Holding a plurality of workpieces, in particular a stack of workpieces, in a magazine area of a workpiece magazine, feeding at least one of the workpieces held in the workpiece magazine to a discharge device, discharging the at least one workpiece. Holding can be preceded by a step in which workpieces are stacked.

Further preferred embodiments are described below. Reference is made to the statements above with regard to the advantages.

It is preferable that a first and/or second feed element is/are lowered during feeding. In the case of a first and second feed element, the movement can take place jointly, for example synchronously.

According to a preferred variant, it is provided that the workpiece, preferably the lowest workpiece of a workpiece stack, is drawn in, wherein the workpiece is further brought into contact with one or a plurality of discharge elements.

As soon as the frictional force exceeds the force friction between the lowest workpiece and the workpiece lying directly above it, the lowest workpiece 2 is discharged. Subsequently, the first and/or second feed element is/are moved back to the starting position so that a new separation process can be started.

It is preferable that feeding is carried out with a feed device, which feed device has first feed elements that are arranged at least in sections in the region of edges of the magazine area.

In one embodiment, it is provided that the feed device has at least one second feed element which is arranged at least in sections at a distance from edges of the magazine area, in particular between first feed elements.

It is preferable that the first feed elements and the second feed element can be moved together or separately.

In particular, first feed elements and the second feed element are mechanically and/or electronically connected to each other. For example, the first feed elements and the second feed element are mechanically connected to each other or formed integrally. In this way, it is possible to carry out a common discharge movement. In particular, the feed elements can be connected by means of a common base.

Alternatively, according to a further variant, it is provided that the first feed elements and the at least one second feed element are electronically connected to each other (via a common control device for example), and in particular are movable separately from each other. It is preferable, however, that the movements of the feed elements are synchronised with each other.

It is preferable that the first feed elements and the second feed element are moved simultaneously. Alternatively, it is conceivable, for example, to initially move the first feed elements, and in this way to raise the workpiece or workpieces slightly. Following this, a path-controlled or force-controlled movement of the at least one second feed element is performed.

In one variant, it is provided that the second feed element is bolt-shaped or strip-shaped at least in sections.

In a modification, as part of the method, a discharge device is used which has at least one discharge element for discharging a workpiece from the workpiece magazine, said discharge element preferably having a circulating endless conveyor.

In this case, it is especially preferable that the discharge device has two discharge elements, in particular circulating endless conveyors, it being preferable that the second feed element of the feed device is arranged between the discharge elements.

The apparatus used can have a suction device for drawing a workpiece to be discharged to the discharge device, it being further preferable that the suction device has at least one suction opening which ends in the region of the discharge device.

The suction device can have a negative pressure line with a closing device by means of which the negative pressure supply in the negative pressure line can be at least partially interrupted.

It is preferable that the closing device is synchronised with the feed device, preferably is actuated by the feed device.

BRIEF DESCRIPTION OF THE DRAWINGS

FIG. 2 shows schematically a lateral sectional view of the apparatus shown in FIG. 1 in a first operating state;

FIG. 3 shows schematically a lateral sectional view of the apparatus shown in FIG. 1 in a second operating state.

DETAILED DESCRIPTION OF PREFERRED EMBODIMENTS

Figure 1:
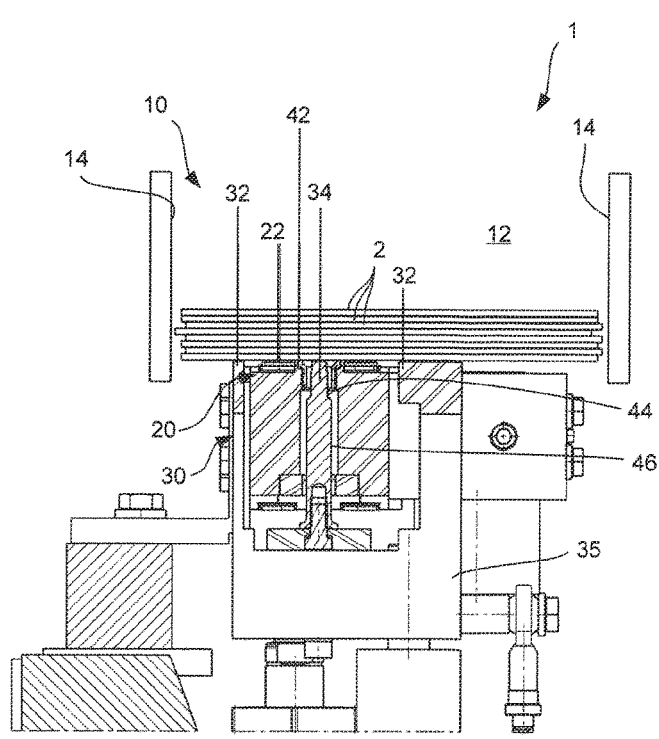
FIG. 1 shows schematically a frontal sectional view of an embodiment of the apparatus according to the invention.

Preferred embodiments of the invention will be described in the following with reference to the associated drawings.

An apparatus 1 for separating workpieces according to a preferred embodiment of the invention is illustrated schematically in various sectional views in FIGS. 1 to 3. The apparatus 1 is used to separate workpieces 2 which can consist, for example, of wood, wood-based materials, plastic or the like. The apparatus 1 is particularly suitable for comparatively flexible workpieces, such as panels for covering floors or walls in particular. However, in principle any workpieces can be separated.

Although not shown in the figures, the separating apparatus 1 can advantageously be part of a machining device for machining workpieces, said machining device having, for example, a milling unit, drilling unit, sawing unit or a variety of other machining units.

The separating apparatus 1 initially has a workpiece magazine 10, a stack of workpieces 2 being arranged in the magazine area 12 thereof. A discharge device 20 for discharging a workpiece 2 out of the workpiece magazine 10 is provided underneath the workpiece stack. In the present embodiment, the discharge device 20 has two conveyor belts 22 (cf. FIG. 1 and FIG. 2).

The separating apparatus 1 further has a feed device 30 which is used to feed the respective workpiece 2 to be discharged from the workpiece magazine 10 to the discharge device 20 or to keep the remaining workpiece stack separate from the discharge device 20. For this purpose, the feed device 30 initially has first feed elements 32. As can be seen in FIG. 1, the first feed elements 32 are arranged in the region of edges 14 of the magazine area 12 so that they support the edges of the respective workpieces 2. In the embodiment shown in FIG. 1, the edges of the magazine area 12 are formed by walls. However, it is not necessary for a physical boundary to be provided at the edges 14 of the magazine area 12.

In addition, in the present embodiment, the feed device 30 has second feed elements in the form of lifting bolts 34 which are located between the first feed elements 32. The second feed element, however, can also be configured in a variety of ways, for example as one or a plurality of strips.

The first and second feed elements can be moved (in particular vertically) in a feed direction which extends between the workpiece magazine 10 and the discharge device 20 in order to perform the feeding and lifting movement of each of the workpieces.

In the embodiment shown, the first feed elements 32, which are strip-shaped, and the plurality of second feed elements are connected to each other via a common base 35 of the feed device 30. The base 35, when viewed in cross-section (FIG. 1), is U-shaped. A drive (not shown) leads to a movement of the base 35, and thus to an adjustment of the feed elements 32, 34.

In the region of the discharge device 20, the separating apparatus 1 in the present embodiment further has a suction device 40 for drawing the respective workpiece 2 to be discharged to the discharge device 20. In the present embodiment, the suction device 40 has a plurality of suction openings 42 which are arranged in each case in the region of the second feed elements 34. A negative pressure line 46 leads to the suction openings 42. In order to be able to interrupt the supply of negative pressure or vacuum to the suction openings 42 at least partially or temporarily, a closing device 44 is also provided, which in the present embodiment is formed by a circulating shoulder on the lifting elements 34. The result is a synchronised actuation of closing device 44 and feed device 30.

Operation of the separating apparatus 1 is performed, for example, with reference to FIGS. 2 and 3 as follows. In the starting position shown schematically in FIG. 2, the first and second feed elements 32 and 34 of the feed device 30 are extended so that the workpieces 2 of the workpiece stack in the workpiece magazine 10 are at a distance from the discharge device 20. In addition, in this state the supply of negative pressure to the suction openings 42 is at least partially interrupted by the closing device 44. In this state, the discharge device 20 will already be in a continuous conveying mode, although the discharge device 20 can also be stopped as needed or during longer work breaks.

As soon as a workpiece 2 is to be separated, the first and second feed elements 32 and 34 of the feed device 30 are lowered selectively. As a result, the suction openings 42 are brought into fluid communication with the negative pressure in the negative pressure line 46, so that the lowest workpiece 2 of the workpiece stack is drawn to the discharge device 20. In the course of lowering the first and second feed elements 32 and 34, the lowest workpiece 2 comes into contact with the conveyor belts 22 of the discharge device 20, and an increasingly high frictional force builds up which is reinforced by the suction force of the suction device 40.

As soon as the frictional force exceeds the force friction between the lowest workpiece 2 and the workpiece 2 lying directly above it, the lowest workpiece 2 is discharged, as can be seen in FIG. 3. Immediately thereafter, the first and second feed elements 32 and 34 are moved into the starting position again according to FIG. 2, so that a new separation process can be started.

The invention claimed is:

1. An apparatus for separating workpieces which preferably consist at least in sections of wood, wood-based materials, or plastic comprising:
    a workpiece magazine with a magazine area for holding a plurality of workpieces, in particular a stack of workpieces; and
    a discharge device for discharging a workpiece out of the workpiece magazine,
    wherein the apparatus has a feed device which is set up to feed at least one workpiece held in the workpiece magazine to the discharge device,
    wherein the feed device has at least one second feed element, which is arranged at least in sections at a distance from edges of the magazine area, and
    wherein the second feed element is bolt-shaped or strip-shaped at least in sections.

2. The apparatus according to claim 1, wherein the feed device has first feed elements, which are arranged at least in sections in the region of edges of the magazine area.

3. The apparatus according to claim 1 or 2, wherein the at least one second feed element is arranged at least in sections in between the first feed elements.

4. The apparatus according to claim 2, wherein the first feed elements and the second feed element are mechanically and/or electronically connected to each other.

5. The apparatus according to claim 1, wherein the discharge device has at least one discharge element for discharging a workpiece out of the workpiece magazine, the discharge element preferably having a circulating endless conveyor.

6. The apparatus according to claim 5, wherein the discharge device has two discharge elements, in particular circulating endless conveyors, it being preferable that the second feed element of the feed device is arranged between the discharge elements.

7. The apparatus according to claim 1, wherein characterised in that it has a suction device for drawing a workpiece to be discharged to the discharge device.

8. The apparatus according to claim 7, wherein the suction device has at least one suction opening which ends in the region of the discharge device.

9. The apparatus according to claim 7 or 8, wherein the suction device has a negative pressure line with a closing device by means of which the negative pressure supply in the negative pressure line can be at least partially interrupted.

10. The apparatus according to claim 9, wherein the closing device is synchronised with the feed device, preferably is operated by the feed device.

11. A machining device for machining workpieces which preferably consist at least in sections of wood, wood-based materials, or plastic or the like, comprising:
 a separating apparatus according to claim 1; and
 a machining unit for performing the workpiece machining.

12. A method for separating workpieces which workpieces preferably consist at least in sections of wood, wood-based materials, or plastic or the like, comprising the steps:
 holding a plurality of workpieces, in particular a stack of workpieces, in a magazine area of a workpiece magazine;
 feeding, by a feed device, at least one workpiece held in the workpiece magazine to a discharge device; and
 discharging, by the discharge device, the at least one workpiece,
 wherein the feed device has at least one second feed element, which is arranged at least in sections at a distance from edges of the magazine area, and
 wherein the second feed element is bolt-shaped or strip-shaped at least in sections.

13. The method according to claim 12, wherein a first and/or second feed element is/are at least partially lowered during feeding.

14. The method according to claim 12 or 13, wherein the workpiece, preferably the lowest workpiece of a workpiece stack, is drawn in, it being preferable that the workpiece is further brought into contact with one or a plurality of discharge elements.

* * * * *